(12) United States Patent
Goel et al.

(10) Patent No.: US 9,411,783 B2
(45) Date of Patent: Aug. 9, 2016

(54) METHOD AND APPARATUS FOR SELECTIVE SYNCHRONIZATION OF A DISPLAY LAYOUT

(75) Inventors: Paresh Goel, Ghaziabad (IN); Christian Kitchener, Seattle, WA (US); Douglas A. Waterfall, Seattle, WA (US); Shailja Gupta, Tri Nagar (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 669 days.

(21) Appl. No.: 13/547,695

(22) Filed: Jul. 12, 2012

(65) Prior Publication Data

US 2014/0019850 A1 Jan. 16, 2014

(51) Int. Cl.
*G06F 17/21* (2006.01)

(52) U.S. Cl.
CPC .................... *G06F 17/212* (2013.01)

(58) Field of Classification Search
CPC . G06F 17/212; G06F 17/246; G06F 17/2247; G06F 17/5081; G06F 1/3206; G06F 3/0412; H04N 5/23232; H04N 3/1593; A63F 13/52
See application file for complete search history.

(56) References Cited

U.S. PATENT DOCUMENTS

| | | | |
|---|---|---|---|
| 5,893,913 A * | 4/1999 | Brodsky | G06F 8/71 |
| 6,247,135 B1 | 6/2001 | Feague | |
| 6,725,239 B2 * | 4/2004 | Sherman et al. | |
| 6,791,581 B2 * | 9/2004 | Novak et al. | 715/744 |
| 7,373,362 B2 * | 5/2008 | Detweiler | G06F 17/30008 |
| 7,417,644 B2 | 8/2008 | Cooper et al. | |
| 7,895,522 B2 * | 2/2011 | Wong | H04L 67/36 715/243 |
| 8,099,663 B2 | 1/2012 | Mayor et al. | |
| 2004/0015893 A1 * | 1/2004 | Banavar et al. | 717/138 |
| 2009/0319910 A1 | 12/2009 | Escapa et al. | |
| 2010/0146393 A1 | 6/2010 | Land et al. | |
| 2013/0339833 A1 * | 12/2013 | Chen | G06F 17/211 715/220 |

* cited by examiner

*Primary Examiner* — Andrew Dyer
*Assistant Examiner* — Warren Campbell, Jr.
(74) *Attorney, Agent, or Firm* — Keller Jolley Preece

(57) ABSTRACT

A method and apparatus for synchronizing selected attributes of a target page element on a target display layout with modified attributes of a source page element on a source display layout is disclosed. The method comprises receiving a command to synchronize a target display layout, wherein the target display layout comprises at least one target page element linked to a source page element on a source display layout; accessing a plurality of synchronization preferences, wherein the synchronization preferences define at least one selected attribute of a plurality of attributes of a target page element to be synchronized with an attribute of the linked source page element; determining whether the selected attribute of the source page element has been synchronized with the target page element; and updating the target page element when the modified attribute of the source page element has not been synchronized with the target page element.

20 Claims, 4 Drawing Sheets

METHOD AND APPARATUS FOR SELECTIVE SYNCHRONIZATION OF A DISPLAY LAYOUT

BACKGROUND OF THE INVENTION

1. Field of the Invention

Embodiments of the present invention generally relate to digital publishing and, more particularly, to a method and apparatus for selective synchronization of a display layout.

2. Description of the Related Art

With the rapid growth of the Internet, people are moving to viewing content online. A document such as a magazine, brochure, or online book is designed for a display in a particular medium, for example, print. However, this display, referred to as the source layout, is read by others on a variety of display (or target) devices such as tablet computers, mobile phones, PDAs, laptop computers and the like. These target devices possess different characteristics, such as screen size or resolution, thereby establishing different target display layouts for different target devices. Digital publishing often involves maintaining multiple copies of target display layouts for use on different target devices. These target display layouts comprise multiple target page elements similar to those on the source layout. The target display elements may be linked to a source display element for synchronization such that a modification to one or more attributes of a source display element is reflected in the target display elements.

The display elements (target page elements and source page elements), may, for example, be drawing objects and have multiple attributes, such as shape, size, color, transparency and the like. A majority of the page elements are similar across these various target display layouts. However, designers may want to change a few attributes of the target page elements like size, shape, and color to suit the need for the target device, while being able to keep the target page item synchronized with its source page element for the rest of the attributes.

Currently, a designer must create a source layout and a target layout separately defining the elements and their attributes independently. The selective updating of target attributes is currently not possible.

Therefore, there is a need for a method and apparatus for selective synchronization of a display layout (e.g., target display layout) that allows selective update of attributes of target display elements.

SUMMARY OF THE INVENTION

The present invention provides a method and apparatus for synchronizing selected attributes of a target page element on a target display layout with modified attributes of a source page element on a source display layout. In one embodiment, the method for synchronization of the display layout comprises receiving a command to synchronize a target layout, wherein the target layout comprises at least one target page element linked to a source page element on a source layout. The method accesses a plurality of synchronization preferences, wherein the synchronization preferences define at least one selected attribute of a plurality of attributes of a target page element to be synchronized with an attribute of the linked source page element. The method then determines whether the selected attribute of the source page element has been synchronized with the target page element; and updates the target page element when the modified attribute of the source page element has not been synchronized with the target page element.

Figure 1:
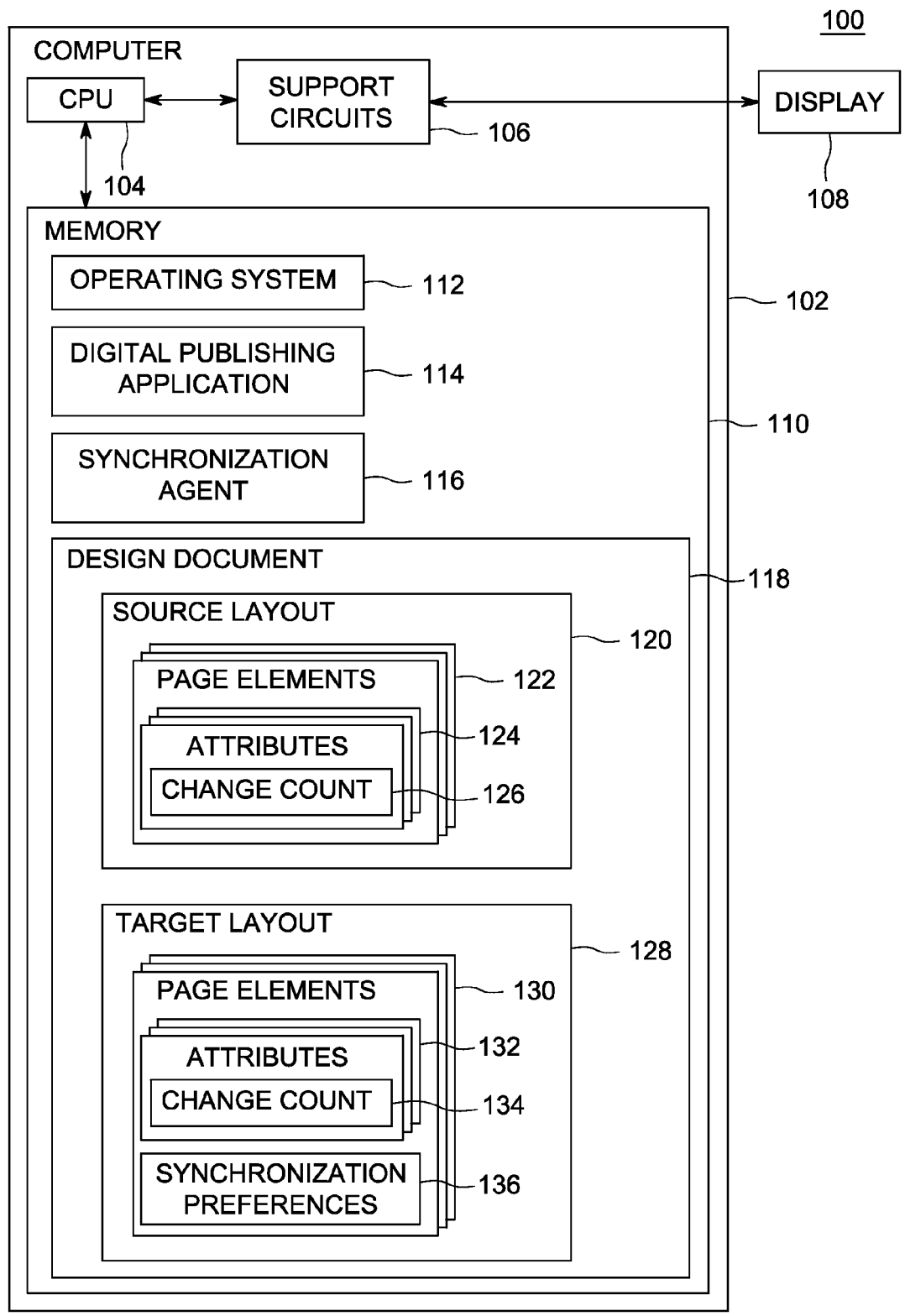
FIG. 1 depicts a block diagram of a system for selective synchronization of a display layout, according to one or more embodiments of the invention.

While the method and apparatus is described herein by way of example for several embodiments and illustrative drawings, those skilled in the art will recognize that the method and apparatus for selective synchronization of a display layout are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for selective synchronization of a display layout as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for selective synchronization of a display layout. Embodiments of the invention access a target page layout that has page elements linked to elements contained in a source page layout. Linking is a mechanism by which two page elements can be bound together such that changes in one element (e.g., the source page element) can be transferred to the other (e.g., the target page element). A page designer may specify that one or more attributes of a given target page element remain synchronized with the linked source page element, while specifying that other attributes of the page element remain as originally defined for the target page element. For example, a page designer may specify that the target page element maintain the color of the corresponding source page element, but not the size or shape. Thus, any change in the source page element's color will be applied to the target page element, but any change to the source page element's shape or size will not be applied to the target page element.

When modifications are made to one or more attributes of one or more page elements on the source page layout, the modifications are stored with the source layout. Every attribute maintains its own change count. The change count for an attribute of a source page element is incremented when the attribute is modified. Later, when a request is received to synchronize the target page elements with the source page elements, the method compares the target page elements to the source page elements. For each target page element, the method determines whether the element is linked to a source page element. If the element is linked to a source page element, the method determines whether any attributes of the element are selected to be synchronized. If an attribute is marked for synchronization, the method accesses the change count of that attribute of the linked source page element. If the change count is different from the change count stored with the attribute of the target page element, that indicates the source page element's attribute has been modified since the last synchronization, and the method applies the source page element's attribute to the target page element. The method then updates the target change count to match the change count of the source page element's attribute. The method iterates until all attributes of all target page elements that have been marked for synchronization, have been synchronized with attributes of the source page elements.

Various embodiments of an apparatus and method for selective synchronization of a display layout are described. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for synchronization of a display layout, according to one or more embodiments of the invention. The system 100 comprises a computer 102 and a display 108. The display 108 may be any type of visual display such as a computer monitor, an iPad, a screen on a mobile device and the like.

The computer 102 comprises a CPU 104, support circuits 106, and a memory 110. The computer 102 is a type of computing device (e.g., a laptop, a desktop, a Personal Digital Assistant (PDA) and/or the like). The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, displays, and the like. The memory 110 comprises at least one of Read Only Memory (ROM), Random Access Memory (RAM), disk drive storage, optical storage, removable storage and/or the like. The memory 110 comprises an operating system 112, a digital publishing application 114, a synchronization agent 116 and a design document 118. The design document 118 comprises a source layout 120 and a target layout 128. The source layout 120 comprises at least one source page element 122 (a plurality of source page elements 122 are illustrated in FIG. 1). The source page element 122 comprises a plurality of attributes 124. Each attribute 124 comprises a change count 126. The target layout 128 comprises at least one target page element 130 (a plurality of target page elements 130 are illustrated in FIG. 1). The target page element 130 comprises a plurality of attributes 132. Each attribute 132 comprises a change count 134. In some embodiments, the target layout 128 is stored in the design document 118. In some embodiments, the target layout 128 is stored in the memory 110 in a separate design document (not shown).

According to some embodiments, the operating system (OS) 112 generally manages various computer resources (e.g., network resources, file processors, and/or the like). The OS 112 is configured to execute operations on one or more hardware and/or software modules, such as Network Interface Cards (NICs), hard disks, virtualization layers, firewalls and/or the like. Examples of the OS 112 may include, but are not limited to, Linux, Mac OSX, BSD, Unix, Microsoft Windows, and the like.

The digital publishing application 114 is utilized to create the source layout 120 and the target layout 128. The digital publishing application 114 may be ADOBE® InDesign, ADOBE® Illustrator, ADOBE® Muse, ADOBE® Lightroom, ADOBE® Photoshop, ADOBE® Flash Professional, provided by ADOBE® Systems, Inc. of San Jose, Calif., or any digital publishing application capable of creating visual page layouts. Upon creation of the target layout 128, the digital publishing application 114 links the elements of the source layout 120 with the elements of the target layout 128. When elements are linked, the elements are bound together such that a change in a source page element 122 is applied to the target page element 130 with which it is linked when the synchronization agent 116 synchronizes the target layout 128. However, not all attributes 124 of a source page element 122 are desirable when applied to a given target page element 130. As such, a designer may elect to apply certain attributes 124 of a source page element 122 to a given target page element 130 and elect not to apply others. For example, a designer may want the color of a source page element 122 applied to a target page element 130, but may not want the size or shape of the source page element 122 applied to the target page element 130. The designer may specify these synchronization preferences 136, which are then stored with the target page element 130.

When a target layout 128 is created by the digital publishing application 114, a source attribute change count 126 is stored with each attribute 124 of each source page element 122. In addition, a target attribute change count 134 is stored with each attribute 132 of each target page element 130. In some embodiments, both the source attribute change count 126 and the target attribute change count 134 are initialized to zero. Each time an attribute 124 of a source page element 122 is modified, the change count 126 for that attribute is incremented. When the synchronization agent 116 receives a request to synchronize the target layout 128, the synchronization agent 116 determines which attributes of which elements need to be updated based on the change counts. For example, if the designer wants the color of a particular source page element 122 to be applied to a corresponding target page element 130, the synchronization agent 116 determines whether the target attribute change count 134 is the same as the source attribute change count 126. If the change counts are the same, then attributes are in sync. However, if the change counts are different, it means the attribute 124 of the source page element 122 has been modified and has not yet been synced with the corresponding attribute 132 of the target page element 130. Thus, when the change counts are different, the modified attribute 124 of the source page element 122 is applied to update the corresponding attribute 132 of the target page element 130, and the change count 134 of the target page element's attribute is updated to match the source attribute change count 126. The method iterates through every attribute of every linked page element until synchronization is complete.

Figure 2:
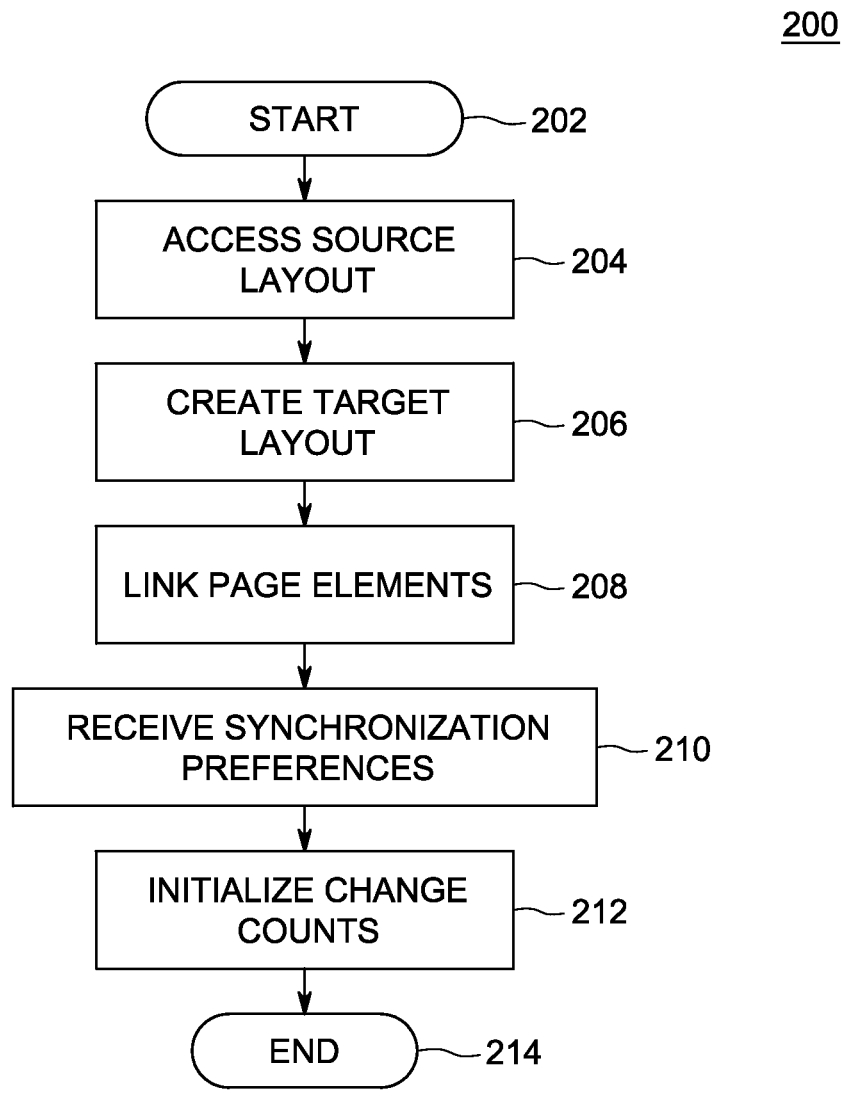
FIG. 2 depicts a flow diagram of a method for initializing a target layout for synchronization as performed by the digital publishing application of FIG. 1, according to one or more embodiments of the invention.

FIG. 2 depicts a flow diagram of a method 200 for initializing a target layout for synchronization as performed by the digital publishing application 114 of FIG. 1, according to one or more embodiments of the invention.

The method 200 starts at step 202 and proceeds to step 204. At step 204, the method 200 accesses a source layout. The source layout comprises at least one source page element. Each source page element comprises a plurality of attributes, such as color, shape, size, and the like. A designer of a source layout may create a similar layout for one or more target devices. For example, if the source document is designed as a print version for a magazine, the designer may want to create a similar layout for viewing on a mobile device. Different types of mobile devices have different dimensions, so the designer may want the source page elements scaled differently for the one or more target devices. In order to accommodate a given target device's size, shape, orientation and the like, the designer may want to change one or more elements or their attributes when the layout is displayed on the one or more target devices. The method 200 proceeds to step 206.

At step 206, the method 200 creates a target layout. The target layout typically contains similar page elements as are contained on the source layout. The method 200 copies the source page elements of the source layout to the target layout. In some embodiments, the method 200 may also add additional target page elements to the target layout irrespective of the source layout. The method 200 proceeds to step 208.

At step 208, the method 200 links the target page elements in the target layout to their corresponding source page elements in the source layout. Linking is a mechanism by which two page elements can be bound together such that changes in a source page element can be transferred to the target page element. The method 200 proceeds to step 210.

At step 210, the method 200 receives synchronization preferences. Synchronization preferences override what attributes are to be updated when the attributes change in a source page element that is linked to a target page element. For example, a designer may want a target page element to maintain the color of the source page element to which it is linked. Hence, whenever the color of the source page element is modified, the color of the source page element will be applied to the linked target page element during synchronization. However, the designer may want the target page element to maintain the size and shape defined by the designer (and not the size and shape of the linked source page element). Accordingly, the designer's synchronization preferences for the target page element are stored with the target page element. The following is an example of how the synchronization preferences are stored.

<LinkedPageItemOption UpdateLinkWhileSaving="false" WarnOnUpdateOfEditedPageItem="true" PreserveSizeAndShape="true" PreserveColor="false" PreserveInteractivity="false" PreserveFrameContent="false" PreserveOthers="false" />

The PreserveSizeAndShape="true" statement means maintain the size and shape of the target page element as defined by the designer during synchronization. However, because the PreserveColor="false", the target page element will have its color synchronized with its linked source target element. These examples are purely illustrative. Additional preferences may be defined to correspond to additional attributes. The method 200 proceeds to step 212.

At step 212, the method 200 initializes the change counts for the attributes of the source page elements and the attributes of the target page elements for linked page elements. The change counts are initially set to be equal, for example, zero. When the change count of a source page element's attribute is the same as the change count of a linked target page element's attribute, it means the attributes are synchronized. When an attribute of a source page element is modified, the change count for that attribute is incremented. During a later synchronization, it will be determined that the change count of the modified attribute of the source page element is not equal to the change count of the corresponding attribute of the target page element. The unequal change counts indicate the target page element is out of sync with the source page element, specifically, the attribute has been modified on the source layout and the modification has not yet been applied to the target layout. The method 200 proceeds to step 214 and ends.

Figure 3:
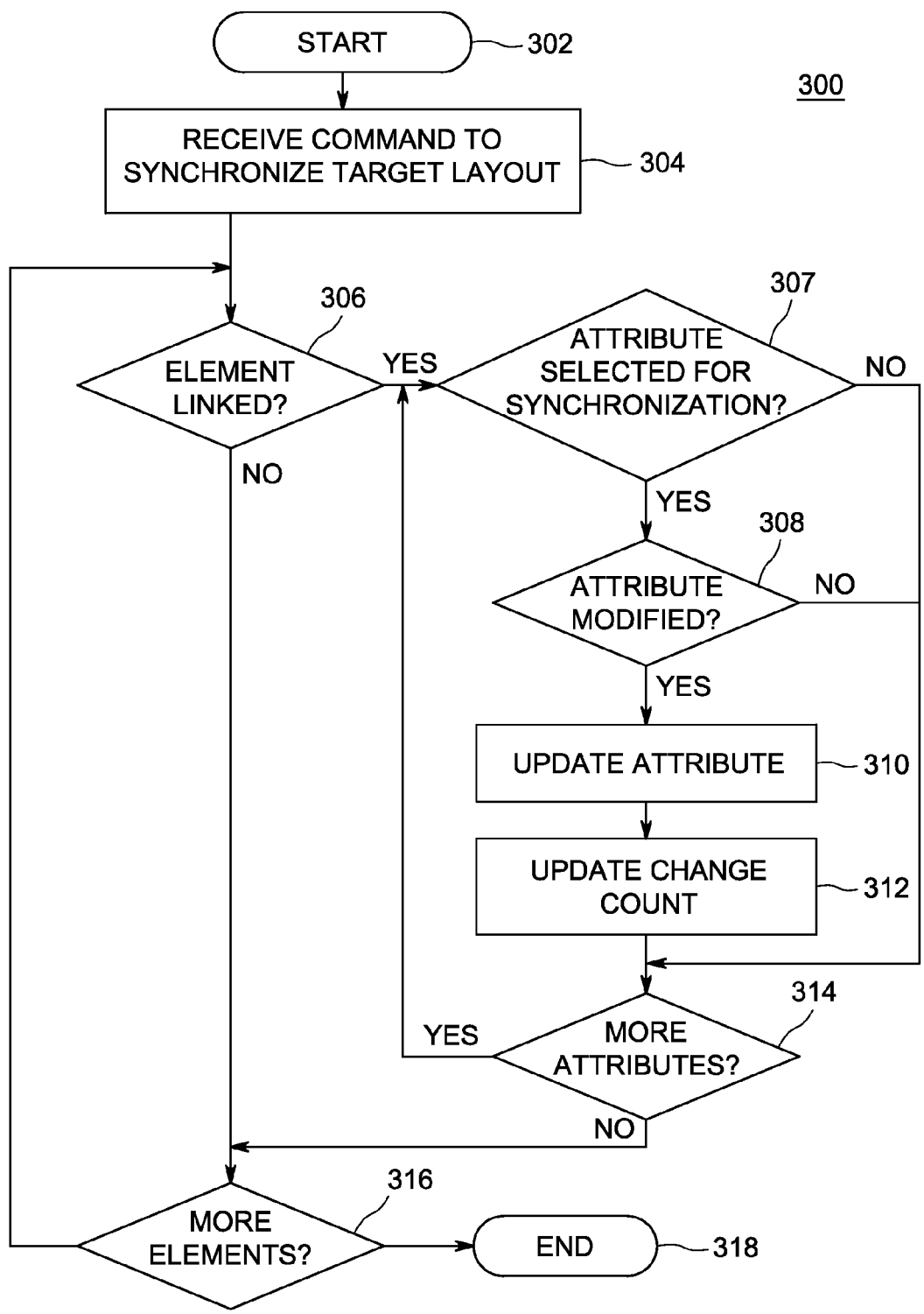
FIG. 3 depicts a flow diagram for a method for synchronizing a target layout with a source layout as performed by the synchronization agent of FIG. 1, according to one or more embodiments of the invention.

FIG. 3 depicts a flow diagram for a method 300 for synchronizing a target layout with a source layout as performed by the synchronization agent 116 of FIG. 1, according to one or more embodiments of the invention. The method 300 iterates through each target page element on the target layout to determine if it is linked to a source page element. If it is linked, the method iterates through each attribute of the target page element and updates any attributes that are selected to be synchronized and have been modified in the source layout.

The method 300 starts at step 302 and proceeds to step 304. At step 302, the method 300 receives a command to synchronize a target layout. In some embodiments, the command occurs via a user interface gesture, such as clicking on an 'Update' button. In other embodiments, the command to synchronize occurs when the source layout is saved. The method 300 proceeds to step 306.

At step 306, the method 300 determines whether a target page element is linked to a source page element. If the target page element is not linked to a source page element, the method 300 proceeds to step 316. However, if at step 306, the method 300 determines the target page element is linked to a source page element, the method 300 proceeds to step 307.

At step 307, the method 300 determines whether an attributed in the linked target page element is selected for synchronization. If an attribute is selected for synchronization, it will be stored with the synchronization preferences, as shown with respect to method 200. An attribute of <PreserveShape=true> means the shape attribute will not sync with the source attribute, but will preserve the shape defined for it in the target page element. An attribute of <PreserveColor=false> means the color attribute is to be synchronized with the source page element color attribute. If the attribute has not been selected for synchronization, the method 300 proceeds to step 314. If the attributed has been selected for synchronization, the method 300 proceeds to step 308. At step 308, the method 300 determines whether an attribute in the linked source page element has been modified. The method 300 compares the change count of the attribute of the source page element to the change count of the corresponding attribute of the target page element. If the change counts are unequal, the source page element's attribute has been modified and the modification has not been applied to update the attribute of the target page element. If the method 300 determines the change counts are equal, the attribute of the source page element has not been modified, and the method 300 proceeds to step 314. However, if at step 308, the method 300 determines the change counts are unequal, the attribute of the source page element has been modified, and the method 300 proceeds to step 310.

At step 310, the method 300 updates the target page element's attribute. Accordingly, the attribute of the source page element is copied to the target page element. The method 300 proceeds to step 312.

At step 312, the method 300 updates the change count of the attribute of the target page element to be equal to the change count of the attribute of the source page element. Now the attributes of this page element are synchronized. If other source page elements are modified and a command to synchronize the target layout with the source layout is received, the current attribute will not be updated because the change counts will remain equal until this specific attribute for this source page element is modified. The method 300 proceeds to step 314.

At step 314, the method 300 determines whether more attributes exist for this target page element. If the method 300 determines there are more attributes to be synchronized, the method 300 proceeds to step 308. The method 300 iterates until all of the attributes of the target page element that are selected for synchronization are synchronized with the attributes of the linked source page element. If at step 314, the method 300 determines that all of the attributes of the target page element are synchronized, the method 300 proceeds to step 316.

At step 316, the method 300 determines whether there are additional elements to synchronize on the target layout. If the method 300 determines that there are additional elements to synchronize, the method 300 proceeds to step 306. The method 300 iterates until all target page elements on the target layout that are linked to source page elements on the source layout, and have been selected for synchronization, have been synchronized.

If at step 316, the method 300 determines there are no additional elements to synchronize, the method 300 proceeds to step 318 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
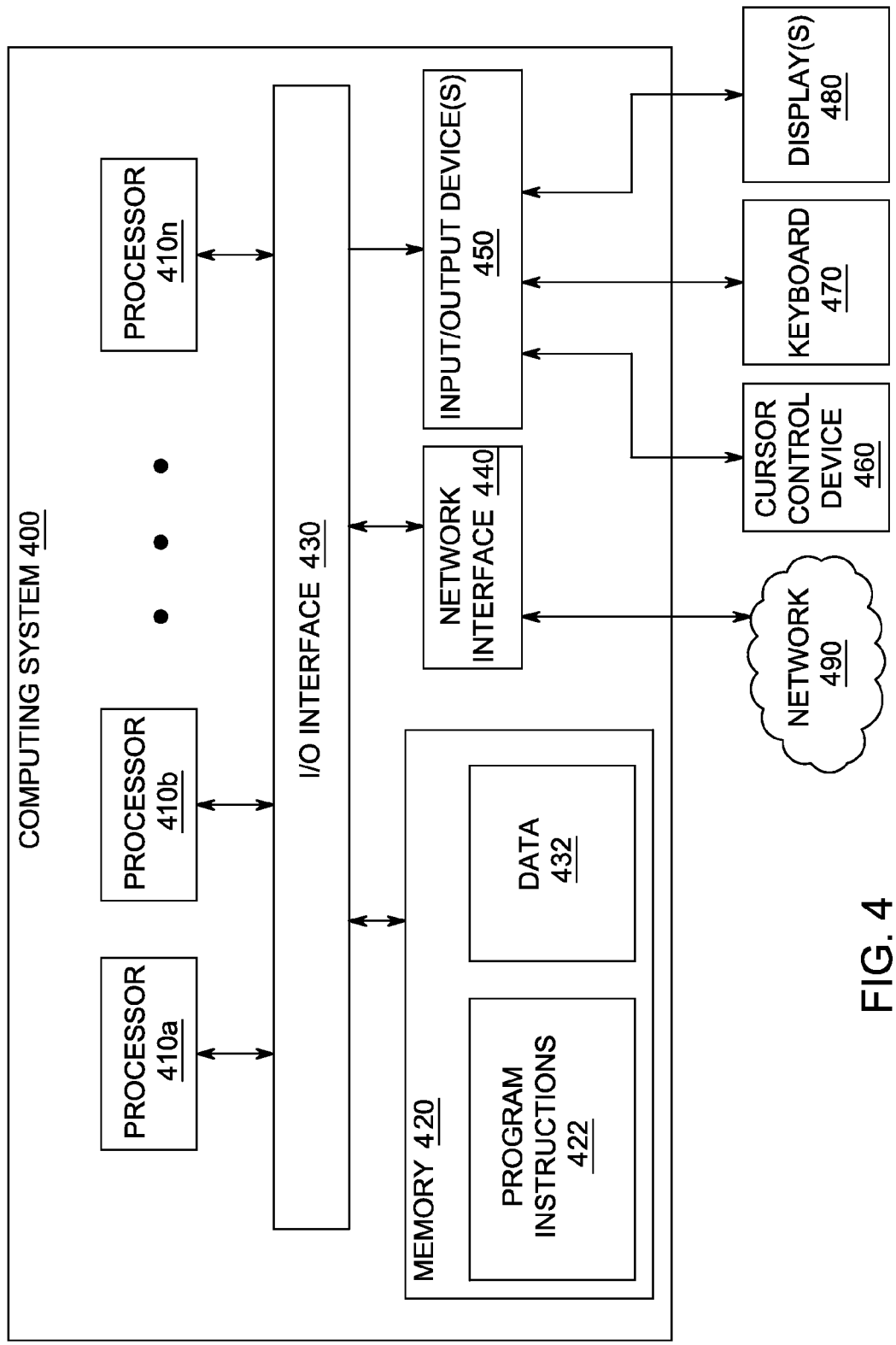
FIG. 4 depicts a computer system that can be utilized in various embodiments of the present invention, according to one or more embodiments of the invention.

FIG. 4 depicts a computer system that can be utilized in various embodiments of the present invention to implement the computer 102, according to one or more embodiments.

Various embodiments of method and apparatus for selective synchronization of a display layout, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450, In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touch pads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowchart of FIGS. 2-3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for synchronizing selected attributes of a target page element on a target display layout with modified attributes of a source page element on a source display layout comprising:
   receiving a command to synchronize a target display layout with a source display layout, wherein the target display layout comprises at least a first target page element with target attributes, the first target page element created based on a corresponding first source page element with source attributes, and a second target page element with target attributes, the second target page element created based on a corresponding second source page element with source attributes;
   determining that the first target page element created based on the corresponding first source page element is also linked to the first source page element on the source display layout, the corresponding first source page element comprising at least one modified source attribute not synchronized with a corresponding at least one target attribute of the first target page element;
   determining that the second target page element created based on the corresponding second source page element is not linked to the second source page element or any other source page element on the source display layout, the corresponding second source page element containing at least one modified source attribute not synchronized with a corresponding at least one target attribute of the second target page element;
   based on the determination that the second target page element created based on the corresponding second source page element is not linked to any source page element, maintaining the target attributes of the second target page element;
   based on the determination that the first target page element created based on the corresponding first source page element is linked to the corresponding first source page element, accessing a plurality of synchronization preferences, wherein the synchronization preferences define one or more selected attributes from the target attributes of the first target page element created based on the corresponding first source page element to be synchronized with one or more selected attributes from the source attributes of the corresponding first source page element, the selected attributes from the source attributes not including the at least one modified source attribute of the corresponding first source page element not synchronized with the corresponding at least one target attribute of the first target page element; and
   based on the synchronization preferences and the determination that the first target page element created based on the corresponding first source page element is linked to the corresponding first source page element, updating the first target page element created based on the corresponding first source page element with the one or more selected attributes from the source attributes of the corresponding first source page element and maintaining the at least one target attribute of the first target page element corresponding to the at least one modified source attribute of the corresponding first source page element.

2. The method of claim 1, wherein the source display layout is defined for a first display medium and the target display layout is defined for a second display medium.

3. The method of claim 1, further comprising determining whether the one or more selected attributes from the source attributes of the corresponding first source page element have been synchronized with the one or more selected attributes from the target attributes of the first target page element created based on the corresponding first source page element; and
   wherein updating the first target page element created based on the corresponding first source page element with the one or more selected attributes from the source attributes of the corresponding first source page element occurs when the one or more selected attributes from the source attributes of the corresponding first source page element have not been synchronized.

4. The method of claim 3, wherein determining whether the one or more selected attributes from the source attributes of the corresponding first source page element have been synchronized with the one or more selected attributes from the target attributes of the first target page element created based on the corresponding first source page element comprises maintaining a change count for the one or more selected attributes from the source attributes of the corresponding first source page element and the one or more selected attributes from the target attributes of the first target page element.

5. The method of claim 4, wherein the change count for the one or more selected attributes from the source attributes of the corresponding first source page element is incremented when a change is made to the one or more selected attributes.

6. The method of claim 5, wherein determining whether the one or more selected attributes from the source attributes of the corresponding first source page element have been synchronized with the one or more selected attributes from the target attributes of the first target page element created based on the corresponding first source page element further comprises comparing the change count for the one or more selected attributes from the source attributes of the corresponding first source page element to the change count for the one or more selected attributes from the target attributes of the first target page element, wherein the attributes have not been synchronized when the change counts are unequal.

7. The method of claim 5, wherein updating the first target page element created based on the corresponding first source page element comprises setting the change count of the one or more selected attributes from the target attributes of the updated target page element equal to the change count of the one or more selected attributes from the source attributes of the corresponding first source page element.

8. A system for synchronizing selected attributes of a target page element on a target display layout with modified attributes of a source page element on a source display layout comprising:
  at least one processor; and
  at least one non-transitory computer readable storage medium storing instructions thereon that, when executed by the at least one processor, cause the system to:
  receive a command to synchronize a target display layout with a source display layout, wherein the target display layout comprises at least a first target page element with target attributes, the first target page element created based on a corresponding first source page element with source attributes, and a second target page element with target attributes, the second target page element created based on a corresponding second source page element with source attributes;
  determine that the first target page element created based on the corresponding first source page element is also linked to the first source page element on a source display layout, the corresponding first source page element containing at least one modified source attribute not synchronized with a corresponding at least one target attribute of the first target page element;
  determine that the second target page element created based on the corresponding second source page element is not linked to the second source page element or any other source page element on the source page layout, the corresponding second source page element containing at least one modified source attribute not synchronized with a corresponding at least one target attribute of the second target page element;
  based on the determination that the second target page element created based on the corresponding second source page element is not linked to any source page element, maintain the target attributes of the second target page element;
  based on the determination that the first target page element created based on the corresponding first source page element is linked to the corresponding first source page element, access a plurality of synchronization preferences, wherein the synchronization preferences define one or more selected attributes from the target attributes of the first target page element created based on the corresponding first source page element to be synchronized with one or more selected attributes from the source attributes of the corresponding first source page element, the selected attributes from the source attributes not including the at least one modified source attribute of the corresponding first source page element not synchronized with the corresponding at least one target attribute of the first target page element; and
  based on the synchronization preferences and the determination that the first target page element created based on the corresponding first source page element is linked to the corresponding first source page element, update the first target page element created based on the corresponding first source page element with the one or more selected attributes from the source attributes of the corresponding first source page element and maintaining the at least one target attribute of the first target page element corresponding to the at least one modified source attribute of the corresponding first source page element.

9. The system of claim 8, wherein the source display layout is defined for a first display medium and the target display layout is defined for a second display medium.

10. The system of claim 8, wherein target attributes of the first target page element created based on the corresponding first source page element not selected to be synchronized with any source attribute of the corresponding first source page element maintain the target attributes defined for the first target page element while other target attributes selected to be synchronized are updated with corresponding source attributes.

11. The system of claim 8, wherein the instructions, when executed by the at least one processor, cause the system to determine whether the one or more selected attributes from the source attributes of the corresponding first source page element have been synchronized with the one or more selected attributes from the target attributes of the first target page element created based on the corresponding first source page element by maintaining a change count for the one or more selected attributes from the source attributes of the corresponding first source page element and the one or more selected attributes from the target attributes of the first target page element.

12. The system of claim 11, wherein the instructions, when executed by the at least one processor, cause the system to increment the change count for the one or more selected attributes from the source attributes of the corresponding first source page element when a change is made to the one or more selected attributes from the source attributes of the corresponding first source page element.

13. The system of claim 12, wherein the instructions, when executed by the at least one processor, cause the system to determine whether the one or more selected attributes from the source attributes of the corresponding first source page element have been synchronized with the one or more selected attributes from the target attributes of the first target page element created based on the corresponding first source page element by comparing the change count for the one or more selected attributes from the source attributes of the corresponding first source page element to the change count for the one or more selected attributes from the target attributes of the first target page element, wherein the attributes are not synchronized when the change counts are unequal.

14. The system of claim 12, wherein the instructions, when executed by the at least one processor, cause the system to set the change count of the one or more selected attributes from the target attributes of the first target page element created based on the corresponding first source page element equal to the change count of the one or more selected attributes from the source attributes of the corresponding first source page element upon updating the first target page element.

15. A computer implemented method for synchronizing selected attributes of target page elements with attributes of source page elements comprising:

accessing a source display layout comprising a plurality of source page elements, each source page element containing source attributes;

creating a target page layout by copying a first source page element having a first plurality of source attributes and a second source page element have a second plurality of source attributes to create a first target page element having a first plurality of target attributes that match the first plurality of source attributes and a second target page element having a second plurality of target attributes that match the second plurality of source attributes;

linking the first target page element created based on the first source page element to the first source page element;

selecting the first plurality of source attributes for synchronization such that changes made to the first source page element and the first plurality of source attributes are automatically made to the first target page element created based on the first source page element and the first plurality of target attributes;

unselecting a first target attribute of the first plurality of target attributes of the target page element created based on the first source page element for synchronization with the corresponding first source attribute of the first plurality of source attributes based on user input;

identifying a change to the first source attribute of the first plurality of source attributes of the first source page element, a change to an additional source attribute of the first plurality of source attributes of the first source page element, and a change to a second source attribute of the second plurality of source attributes of the second source page element;

based on a determination that the second target page element created based on the second source page element is not linked to any source page element, maintaining the second target attribute of the second target page element;

based on a determination that the first source page element is linked to the first target page element but that the first source attribute of the first source page element is unselected for synchronization with the first target attribute of the first target page element created based on the first source page element, maintaining the modified first target attribute of the first target page element; and based on a determination that the first source page element is linked to the first target page element and that the additional source attribute of the first plurality of source attributes of the first source element is selected for synchronization with an additional second target attribute of the first plurality of target attributes of the first target page element, automatically updating the additional target attribute of the first plurality of target attributes of the first target page element to include the change to the additional source attribute of the first plurality of source attributes of the first source page element.

16. The method of claim 15, wherein the source display layout is designed to display on one or more electronic devices and the target page layout is designed to display on one or more separate electronic devices.

17. The method of claim 15, wherein linking the first target page element created based on the first source page element to the first source page element and selecting the first plurality of source attributes for synchronization occurs upon creating the target page layout.

18. The method of claim 15, further comprising:
determining that the second target page element created based on the second source page element is not linked to any source page element on the source display layout;
determining that the first source page element is linked to the first target page element but that the first source attribute of the first source page element is unselected for synchronization with the first target attribute of the first target page element created based on the first source page element; and
determining that the first source page element is linked to the first target page element and that the additional source attribute of the plurality of source attributes of the first source element is selected for synchronization with the additional target attribute of the plurality of target attributes of the first target page element.

19. The method of claim 15, further comprising maintaining a change count for each of the source attributes of source page elements selected for synchronization with target attributes of target page elements.

20. The method of claim 19, wherein automatically updating the additional target attribute of the first plurality of target attributes of the first target page element to include the change to the additional source attribute of the first plurality of source attributes of the first source page element comprises:
determining that a change count of the additional source attribute of the first plurality of source attributes of the first source page element does not match a change count of the additional target attribute of the first plurality of target attributes of the first target page element; and
modifying the additional target attribute of the first plurality of target attributes of the first target page element to match the additional source attribute of the first plurality of source attributes of the first source page element and modifying the change count of the additional target attribute of the first plurality of target attributes of the first target page element to match the change count of the additional source attribute of the first plurality of source attributes of the first source page element.

* * * * *